Oct. 4, 1938.  J. BONHAM  2,132,284
EMERGENCY SCREW THREADED BOLT
Filed March 28, 1938
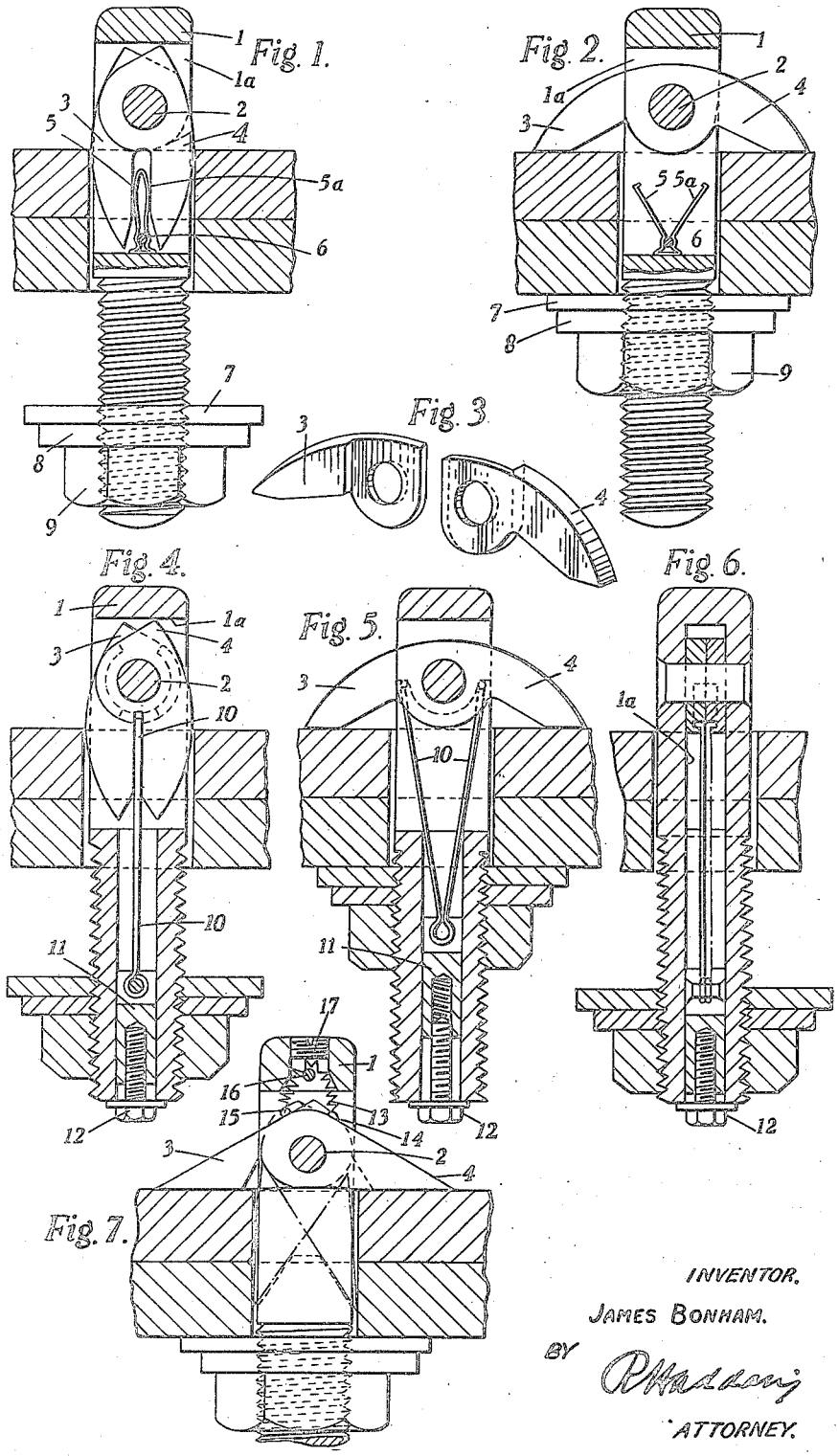
INVENTOR.
JAMES BONHAM.
BY
ATTORNEY.

Patented Oct. 4, 1938

2,132,284

UNITED STATES PATENT OFFICE 2,132,284

EMERGENCY SCREW-THREADED BOLT

James Bonham, North Shields, England, assignor of one-half to Thomas Macdonald, Monkseaton, England Application March 28, 1938, Serial No. 198,531
In Great Britain October 13, 1936

6 Claims. (Cl. 85—3)

This invention consists in an emergency screw-threaded bolt for temporarily holding one object against another.

It is frequently desired to bolt one object against another in a temporary manner in circumstances where it is impracticable to pass the bolt through from the remote side of the latter object. For example when a rivet in a ship's hull plating becomes loose and has to be renewed, it is only after a great deal of trouble and risk to the operator that a bolt can be passed through from the outside of the hull. When the plates are below the water level it is practically impossible to pass a bolt through. To overcome this difficulty the usual practice is to pass through the rivet hole a weight attached to the end of a line, then to pass a looped line from one side of the vessel to the other and then to move this line along the length of the hull until it encounters the weighted line; whereupon the looped line is pulled up with the weighted line suspended therefrom. The weight is replaced by a "fish bolt" that is to say a bolt having an eye formed at the end of its threaded portion, and the line thrown overboard and hauled in through the rivet hole where it is engaged by a nut and drawn up tight. This generally necessitates stopping the vessel to avoid the lines becoming washed against the sides of the vessel, and so involves considerable loss of time and waste of power.

It is the object of the present invention to provide a simple device whereby all that has to be done is to push the bolt through the hole whereupon it is ready for the screwing down operation.

According to the invention the head of the bolt comprises a pair of arms pivotally mounted directly on one end of the bolt shank, a slot in the shank and resilient means mounted in the slot on the shank, the said arms being so mounted and shaped that when the end of the bolt is pushed into a hole the said arms automatically swing inwards, against the action of said resilient means, and pass into and remain within said slot until they have passed completely through the hole, whereupon they are caused by the resilient means to project laterally from the bolt to provide a rigid abutment when pressure is exerted on their inner faces.

Means may also be provided for positively moving the pivotal members into the cut away portion or slot when it is desired to withdraw the bolt.

The invention will now be described by way of example with reference to the accompanying drawing.

In the said drawing:

Fig. 1 is an elevation partly in section showing the bolt being passed through the rivet holes in two overlapping plates.

Fig. 2 is a similar view to Fig. 1 but shows the bolt tightened up.

Fig. 3 is a perspective view of two details.

Figs. 4 and 5 are similar views to Figs. 1 and 2 of an alternative form.

Fig. 6 is a side view of Fig. 4.

Fig. 7 is a fragmentary sectional view of an alternative form of bolt.

Referring more particularly to Figs. 1 to 3, the bolt comprises a screwed shank 1 having its plain portion slotted longitudinally and diametrally at 1a near its end. Inside the said slot at the end of the bolt are pivotally mounted about a pin 2 two similar bolt head arms 3, 4 which at their pivoting portions are rabbeted to receive one another (Fig. 3), with the said rabbets so formed that while the said arms may be swung into the slot they abut against each other when extended substantially at right angles to the bolt shank. Two leaf springs 5, 5a preferably integral with each other are laid longitudinally inside the slot 1a against which springs the arms 3, 4 are adapted to abut as they enter the slot so that to enter wholly into the slot they require to be pressed inwards against the springs 5, 5a. The springs 5, 5a are preferably formed from a single strip which has a double fold at its mid-portion with the leaves 5, 5a extending at an angle from each fold, a pin 6 passing through the shank 1 and between the leaves 5, 5a to hold the springs in position with the flat mid-portion pressed against the end of the slot 1a.

In use, for example on board ship, in the event of a rivet under water level having become loose, the rivet head is cut away, the shank 1 passed with the slotted end foremost through the rivet hole. This causes the arms 3, 4 to close together as shown in Fig. 1 until they are clear of the sides of the hole whereupon they separate under the influence of the springs 5, 5a with their outer ends extending beyond the sides of the hole. A water-tight packing washer 7 is then passed over the bolt, then a metal washer 8 and finally a nut 9 is screwed down the bolt so that the bolt 1 is drawn hard up against the outer face of the plate and the nut 9 against the washer 8 so that a water-tight joint results. If desired, a lock nut may be used in addition to the first mentioned nut. To prevent loss of the bolt 1 the members 7, 8, 9 are preferably threaded on the bolt prior to its insertion in the hole, as shown in Fig. 1.

In the form shown in Figs. 4 to 6 the inner portions of the arms 3, 4 are pivotally connected by a hair pin spring 10 to a threaded sleeve 11 with which engages a headed set screw 12, the said sleeve and set screw being located inside an axial bore in the bolt 1 so that by turning the set screw 12 the arms may be drawn inwards inside the slot against the spreading action of the spring 10.

This form of the device is used in the same way as the device previously described, the set screw having previously been slackened off until it occupies the position shown in Fig. 5, so that on insertion of the bolt into the hole closing together of the arms 3, 4 causes the sleeve 11 and set screw 12 to be pushed outwards; or the arms 3, 4 may first be drawn together as shown in Fig. 4.

The ends of the two arms of the spring 10 are bent over to engage in holes formed in the arms 3, 4 which are recessed for a portion of their peripheries to accommodate the ends of the said spring arms.

The device remains in use until the ship is docked. The form shown in Figs. 1 to 3 can only be removed from the outside. To remove the form shown in Figs. 4 to 6 the nut 9 is removed, the set screw 12 turned or the rod pulled outwards so that the arms 3, 4 are withdrawn into the slot 1a in the bolt 1, when the bolt may be withdrawn.

Another example of the variety of uses to which the invention may be put is the holding of plates temporarily to the structure to which they have to be riveted, the bolt being removed after one or more rivets have been applied.

Fig. 7 shows an alternative form of bolt in which the arms 3, 4 are maintained in the open position by means of a helical spring 13 secured at one end to an eye 14 on the hub of the arm 3 and at its other end to an eye 15 on the hub of the arm 4. To ensure the correct length for the desired extension the spring 13 is passed over a transverse pin 16, a threaded plug 17 being provided in the end of the bolt to facilitate the assembly of the arms 3, 4 and spring 13.

I claim:—

1. A headless threaded emergency bolt adapted to be inserted in holes in which it is a relatively close fit comprising a slotted bolt shank, a pivot pin passing across the slotted portion of said bolt shank, a pair of arms pivotally mounted about said pivot pin and each arm having an abutment surface, resilient means in the slotted portion of said bolt shank, said arms being so mounted and shaped that when the end of the bolt is pushed into a hole the said arms automatically swing inwards against the action of said resilient means and pass into and remain within said slotted portion until they have passed completely through the hole, whereupon the arms are caused by the resilient means to project laterally from the bolt in abutting contact with each other by their abutment surfaces to provide a rigid abutment when pressure is exerted on their inner faces and the arms in abutting contact being capable of swinging around the pivot pin.

2. An emergency bolt according to claim 1 in which the resilient means comprise two leaf springs laid longitudinally inside the slot and against which the arms are adapted to abut as they enter the slot.

3. An emergency bolt according to claim 1 wherein the arms at their pivoting portions are rabbeted to receive one another, said shank being bored to form an axial bore, and axially movable withdrawing means in said bore, said withdrawing means at one end being connected to the inner portions of said arms, and at the other end projecting from the threaded end of said bolt shank.

4. A headless threaded emergency bolt adapted to be inserted in holes in which it is a relatively close fit comprising a slotted bolt shank, a pivot pin passing across the slotted portion of said bolt shank, a pair of arms pivotally mounted about said pivot pin, said arms at their pivoting portions being rabbeted to receive one another and the rabbets being so formed that while said arms may be swung into the slotted portion they abut against each other when extended substantially at right angles to the bolt shank, two leaf springs in the slotted portion of said bolt shank and being laid longitudinally inside the slot and against which the arms are adapted to abut as they enter the slot, said arms being so mounted and shaped that when the end of the bolt is pushed into a hole the said arms automatically swing inwards against the action of said springs and pass into and remain within said slotted portion until they have passed completely through the hole, whereupon they are caused by the springs to project laterally from the bolt to provide a rigid abutment when pressure is exerted on their inner faces, said leaf springs being formed from a single strip having a double fold at its mid-portion to form a flat mid-portion and two leaves extending at an angle from each fold, and a pin passing through the bolt shank and between the leaves to hold the springs in position with the flat mid-portion pressed against the end of the slot.

5. A headless threaded emergency bolt adapted to be inserted in holes in which it is a relatively close fit comprising a slotted bolt shank, said shank being bored to form an axial bore, a threaded sleeve in said bore, a pivot pin passing across the slotted portion of said bolt shank, a pair of arms pivotally mounted about said pivot pin, said arms at their pivoting portions being rabbeted to receive one another and said rabbets being so formed that while said arms may be swung into the slotted portion they abut against each other when extended substantially at right angles to the bolt shank, a hair-pin spring in the slotted portion of said bolt shank, said spring connecting the inner end of the said threaded sleeve to the inner ends of said arms, and a headed set screw engaging in the threaded portion of said threaded sleeve the head of said set screw abutting against the end of said shank remote from its slotted portion, so that by turning said set screw said arms may be drawn inwards inside said slotted portion against the spreading action of said hair-pin spring, said arms being so mounted and shaped that when the end of the bolt is pushed into a hole the said arms automatically swing inwards against the action of said spring and pass into and remain within said slotted portion until they have passed completely through the hole, whereupon they are caused by the spring to project laterally from the bolt to provide a rigid abutment when pressure is exerted on their inner faces.

6. A headless threaded emergency bolt adapted to be inserted in holes in which it is a relatively close fit comprising a slotted bolt shank having its threaded end axially bored into the slotted portion of the bolt shank, a pivot pin passing across the slotted portion of said bolt shank, an abutment pin passing transversely through said bore and parallel with the pivot pin, a pair of arms pivotally mounted about said pivot pin, and a spiral spring in the slotted portion of said bolt shank secured at one end to the inner portion of the one arm and passing over said abutment pin and having its other end secured to the inner portion of the other arm, said arms being so mounted and shaped that when the end of the bolt is pushed into a hole the said arms automatically swing inwards against the action of said spring and pass into and remain within said slotted portion until they have passed completely through the hole, whereupon they are caused by the spring to project laterally from the bolt to provide a rigid abutment when pressure is exerted on their inner faces.

JAMES BONHAM.